United States Patent
Anderton

(10) Patent No.: US 8,538,417 B2
(45) Date of Patent: *Sep. 17, 2013

(54) PERFORMING DIAGNOSTICS IN A WIRELESS SYSTEM

(75) Inventor: David O. Anderton, Austin, TX (US)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,907

(22) Filed: Apr. 24, 2012

(65) Prior Publication Data

US 2012/0208531 A1   Aug. 16, 2012

Related U.S. Application Data

(63) Continuation of application No. 11/152,136, filed on Jun. 14, 2005.

(51) Int. Cl.
*H04W 24/00*   (2009.01)

(52) U.S. Cl.
USPC ....... 455/423; 455/425; 455/67.11; 455/67.7; 455/115.1; 455/115.4; 455/226.1; 455/550.1; 455/557

(58) Field of Classification Search
USPC ............... 455/423, 425, 67.11, 115.1, 115.4, 455/226.1, 550.1, 557
See application file for complete search history.

(56) References Cited

U.S. PATENT DOCUMENTS

| | | | |
|---|---|---|---|
| 5,426,643 A | 6/1995 | Smolinske et al. | |
| 5,557,604 A | 9/1996 | Usumi et al. | |
| 5,586,119 A | 12/1996 | Scribano et al. | |
| 5,623,483 A | 4/1997 | Agrawal et al. | |
| 5,781,593 A | 7/1998 | Petch et al. | |
| 6,064,693 A | 5/2000 | Oliver et al. | |
| 6,421,353 B1 | 7/2002 | Kim | |
| 6,658,027 B1 | 12/2003 | Kramer et al. | |
| 6,754,265 B1 | 6/2004 | Lindemann | |
| 7,248,025 B2 | 7/2007 | Adachi | |
| 7,286,522 B2 | 10/2007 | Preston et al. | |

(Continued)

FOREIGN PATENT DOCUMENTS

| DE | 4417286 A | 11/1995 |
|---|---|---|
| EP | 0876016 A | 11/1998 |

(Continued)

OTHER PUBLICATIONS

Reid A B D et al. "Analytical Methods for Timing Aspects of the Transport of CBR Services Over ATM," BT Technology Journal, Jul. 1, 1995, pp. 26-34, vol. 13, No. 3, BT Laboratories, Great Britain.

(Continued)

*Primary Examiner* — Kiet Doan
*Assistant Examiner* — Khai M Nguyen
(74) *Attorney, Agent, or Firm* — Howison & Arnott, L.L.P.

(57) ABSTRACT

In one embodiment, the present invention includes an apparatus for permitting diagnostic testing of a wireless device. The apparatus may include a first switch to route diagnostic information or acoustic information received from a processor of the device, a codec coupled to the first switch to code the routed diagnostic information or acoustic information, and a second switch coupled to the codec to route the coded diagnostic information to a first port of the wireless device and to route the coded acoustic information to the first port or a second port of the wireless device.

14 Claims, 3 Drawing Sheets

(56) References Cited

U.S. PATENT DOCUMENTS

| | | |
|---|---|---|
| 2002/0006138 A1 | 1/2002 | Odenwalder |
| 2002/0137506 A1* | 9/2002 | Matsuoka ............... 455/425 |
| 2002/0181446 A1 | 12/2002 | Preston et al. |
| 2003/0002609 A1 | 1/2003 | Faller et al. |
| 2003/0204563 A1 | 10/2003 | Oka et al. |
| 2004/0203467 A1* | 10/2004 | Liu et al. ............... 455/67.14 |
| 2007/0073535 A1* | 3/2007 | Chen et al. ............. 704/221 |

FOREIGN PATENT DOCUMENTS

| | | |
|---|---|---|
| EP | 1229747 A2 | 8/2002 |
| EP | 1439719 A1 | 7/2004 |
| EP | 1441491 A | 7/2004 |
| EP | 1441497 A1 | 7/2004 |
| JP | 06046083 | 2/1994 |
| JP | 200472573 A | 3/2004 |
| TW | 564600 B | 12/2003 |
| TW | 1225342 | 12/2004 |
| WO | 00/24144 | 4/2000 |
| WO | 01/84809 A2 | 11/2001 |

OTHER PUBLICATIONS

Patent abstracts of Japan vol. 018, No. 270 (E-1152), May 23, 1994, & JP 06 046083 A NEC Corp; Others: 01 Feb. 18, 1994, abstracts, pp. 2.

Dent, Peter. "GSM Adaptive Multi-Rate Voice Coding on the ™ S320C62xTM DSP". Application Report SPRA625—Feb. 2000.

* cited by examiner

PERFORMING DIAGNOSTICS IN A WIRELESS SYSTEM

CROSS-REFERENCE TO RELATED APPLICATIONS

This application is a continuation of U.S. patent application Ser. No. 11/152,136, filed Jun. 14, 2005, entitled PERFORMING DIAGNOSTICS IN A WIRELESS SYSTEM, the specification of which is incorporated herein in its entirety.

TECHNICAL FIELD

The present invention relates to mobile systems, and more particularly to diagnostic testing of mobile systems.

BACKGROUND

Many different types of mobile systems exist. Examples of such systems include cellular telephone handsets, personal digital assistants (PDAs), notebook personal computers (PCs), and the like. During the design and development of such systems, significant resources are spent to confirm that the design and its implementation operate satisfactorily, both in laboratory testing and in the field during normal operation. With respect to cellular telephones, for example, certain design issues may lead to systemic errors or performance issues that cannot be resolved during design phases or analysis of development or other prototype systems. Instead, such issues often arise only in the context of production systems. As a result, the final round of test and validation for a cellular handset is a systemic problem. All of the components of the phone may meet their respective specifications, but the unit as a whole may fail to meet one or more performance criteria, for a number of reasons. Many of these integration problems are inherently systemic and cannot be reproduced on a reference design, a development platform, or another handset model. Instead, such problems are debugged "in vivo" on the given handset model, and in some cases a specific handset.

Effective system debugging requires some degree of visibility into the internal operation of the handset, which is limited on a production model. Typically, in vivo debugging of handsets is performed using an integrated test mode or a conventional trace facility. The integrated test mode typically provides limited diagnostic capabilities and only allows limited viewing of trace data on a display of the handset. Conventional trace facilities are typically accessed using a serial port of the handset, and the tracing is typically limited to analysis of data from an internal microcontroller unit (MCV). Such trace information does not provide any visibility into the physical layer (Layer 1 in the OSI communication model) or digital signal processor (DSP) data.

Instead, to obtain such data a handset manufacturer may sometimes modify a handset to provide greater visibility. However, such modifications are time consuming and are often ineffective. For example, these modifications can vary operation of a handset to conceal problems, and may destroy the handset. Certainly, these handsets cannot be sold after the modifications are made. Nor are they generally suitable for field-testing of specific phone issues.

Accordingly, improved diagnostics for mobile systems would aid and speed handset development and debugging.

SUMMARY

In one embodiment, the present invention includes an apparatus for permitting diagnostic testing of a production wireless device without any modifications to the device. The apparatus includes a first switch to route diagnostic information or acoustic information received from a processor, a codec coupled to the first switch to code the routed diagnostic information or acoustic information, and a second switch coupled to the codec to route the coded diagnostic information to a first port and to route the coded acoustic information to the first port or a second port. By selecting the switches appropriately, diagnostic information from the processor (which may be a digital signal processor) can be manipulated into a form for transmission through the first port, which may be an external acoustic port of the wireless device.

Another embodiment may be realized in the form of a method for performing a diagnostic routine in a wireless device such as a handset. The method may include generating diagnostic information in the handset, providing the diagnostic information to an external acoustic port of the handset, and forwarding the diagnostic information to a data collection unit from the external acoustic port. The data collection unit may be a personal computer such as a notebook computer or other portable device to allow for field-testing under a variety of conditions and locations.

Still further, an embodiment may be implemented in a mobile device that includes a processor having a data port and a diagnostic port. The processor may be, for example, a digital signal processor. The mobile device may further include a first switch coupled to provide a path to the diagnostic port or the data port. Also, the mobile device may include multiple audio ports, including an internal audio port coupled to the first switch to communicate audio data with the processor and an external audio port coupled to the first switch to communicate diagnostic information between the processor and a data collector during a diagnostic procedure. The data collector may be coupled to the external audio port via an interface unit that performs protocol manipulations on the diagnostic information sent from the mobile device. The interface unit may also provide control signals from the data collector to the mobile device for use in the diagnostic procedure.

BRIEF DESCRIPTION OF THE DRAWINGS

For a more complete understanding, reference is now made to the following description taken in conjunction with the accompanying Drawings in which.

DETAILED DESCRIPTION

In various embodiments of the present invention, a debug port of a wireless device is provided that may be used to inject control directives into and collect real-time trace data from the wireless device. Thus any production device including the port may be used for diagnostic purposes. As a result, phone issues occurring in a specific phone can be debugged using that phone itself. Furthermore, a diagnostic mode may be entered without modification of the handset, and without compromising handset operational modes and functions, as described below.

Virtually all cellular telephone handsets include a bidirectional acoustic port to which an external speaker and microphone can be attached. Embodiments of the invention "purloin" or co-opt this acoustic port for system debugging.

Figure 1:
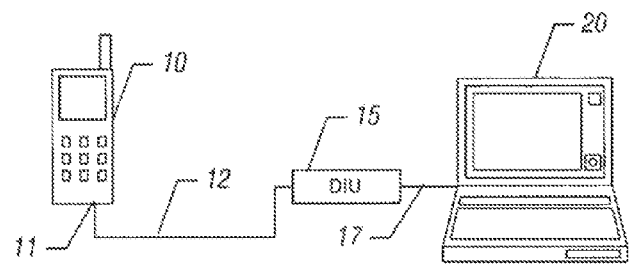
FIG. 1 is a block diagram of a diagnostic setup for a handset in accordance with one embodiment of the present invention.

Referring now to FIG. 1, shown is a block diagram of a diagnostic setup for a handset in accordance with one embodiment of the present invention. As shown in FIG. 1, a handset 10, which may be a cellular phone such as a global system for mobile communications (GSM) handset, is coupled for diagnostic testing. Specifically, as shown in FIG. 1, a bidirectional acoustic port 11 of handset 10 is coupled to a diagnostic interface unit (DIU) 15 via a cable 12. Diagnostic trace data generated within handset 10 may be transmitted through acoustic port 11 to DIU 15. DIU 15 may receive the trace data and convert it to a standard data protocol. For example, in some embodiments DIU 15 may convert the trace data to a universal serial bus (USB) protocol or a recommended standard (e.g., RS-232) protocol. Then DIU 15 may forward the data to a data collection unit 20 via a cable 17. In other embodiments, an interface unit may be omitted, and the handset 10 may be coupled directly to data collection unit 20. In various embodiments, data collection unit 20 may be a personal computer such as a notebook computer. Data collection unit 20 may store the diagnostic information and also may display it on a display. In some embodiments the diagnostic information may be stored and then later accessed. In such manner, field tests can be performed and the data later analyzed.

Furthermore, using data collection unit 20, control directives may be forwarded through DIU 15 for use in controlling diagnostic testing of handset 10. Accordingly, DIU 15 may modulate the control directives and provide them to handset 10 via bidirectional acoustic port 11. These control directives may be passed to a digital signal processor (DSP) within handset 10 for execution of diagnostic routines. The diagnostic routines may include testing of lower level (e.g., physical) layers of the DSP. Thus data collection unit 20 may include one or more storage media including instructions to perform diagnostic testing on a handset in accordance with an embodiment of the present invention. Further, the instructions may control storage and access to diagnostic trace data in data collection unit 20.

Figure 2A:
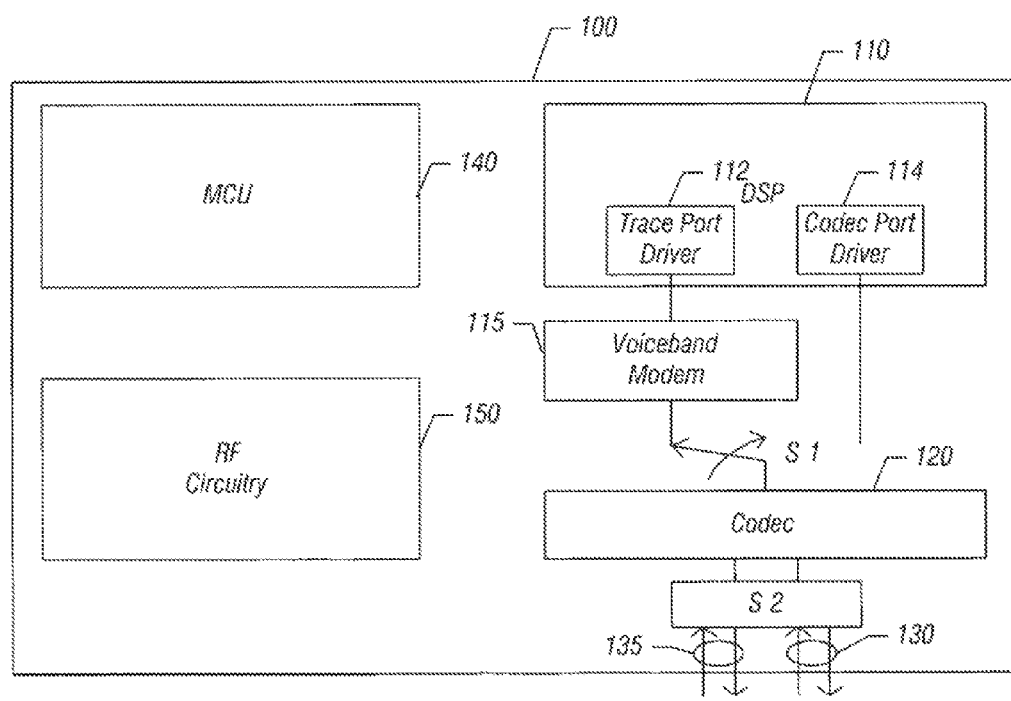
FIG. 2A is a block diagram of an integrated circuit in accordance with one embodiment of the present invention.

Referring now to FIG. 2A, shown is a block diagram of an integrated circuit (IC) 100 in accordance with one embodiment of the present invention. IC 100 may be an ASIC adapted for use in a handset. More specifically, IC 100 may be a single chip integrated circuit that includes both radio frequency (RF) circuitry and baseband circuitry for use in a cellular phone or other wireless communication device.

As shown in FIG. 2A, IC 100 includes a DSP 110. DSP 110 may perform various baseband signal processing activities. These activities may include performing different algorithms to implement desired signal processing functions. As further shown in FIG. 2A, ASIC 100 includes a microcontroller unit (MCU) 140 and RF circuitry 150. MCU 140 may be adapted to execute control applications and handle other functions of ASIC 100. RF circuitry 150 may include transceiver circuitry to both receive and transmit RF signals and convert these signals to and from baseband levels. Accordingly, baseband signals from DSP 110 may be provided to RF circuitry 150 for transmission, and incoming RF signals received by RF circuitry 150 may be converted to baseband and provided to DSP 110 for further processing. While not shown in FIG. 2A, it is to be understood that ASIC 100 may include other components, functionality, ports, and the like.

As shown in FIG. 2A, DSP 110 may include a trace port driver 112 and a codec port driver 114. Trace port driver 112 may be used as a port to transmit and receive trace information during a diagnostic mode. Codec port driver 114 may be used to transmit and receive digital audio data during normal operation.

Still referring to FIG. 2A, trace port driver 112 is coupled to a voiceband modem 115. Modem 115 is used to modulate trace data in a format compatible with the remainder of IC 100. More specifically, modem 115 modulates the data to be compatible with a codec 120 in terms of bandwidth, circuit noise, and the like. In some embodiments, a CCITT standard acoustic modem (e.g., a V.94 modem) may be used. Alternately, a custom modem may be provided. In some embodiments such a custom modem may provide higher data rates, as the trace information does not traverse a telephone network. That is, in some embodiments an acoustic port may accommodate data rates roughly comparable to those of a serial port of the handset, for example, between approximately 50-60 kilobytes per second (kbps), although the scope of the present invention is not so limited.

During diagnostic modes, data from trace port driver 112 is modulated in modem 115 and is switched through a first switch S1 to a codec 120. This diagnostic mode is shown in FIG. 2A, in which switch S1 is selected to couple modem 115 to codec 120. Codec 120 may perform various encoding operations. Coded diagnostic information may then be switched through a second switch S2 to an external acoustic port 130 of IC 100. External acoustic port 130 may be a bidirectional port to both receive and transmit information. In turn, port 130 is coupled to external acoustic port 11 of handset 10, for example, via signal lines on a circuit board of the handset.

During normal operation, voice processing is performed in DSP 110 and digitized data from codec port driver 114 is coupled via switch S1 through codec 120 and switch S2 to either external acoustic port 130 or an internal acoustic port 135 of IC 100, based on whether an external speaker/microphone is present. As shown in FIG. 2A, acoustic ports 130 and 135 are bidirectional, providing output data in one direction (i.e., downlink to an external or internal speaker) and incoming information in the other direction (i.e., uplink via a microphone or other input). A plug detector may determine presence of a plug in external acoustic port 11. If a plug is present, the plug detector may route signals to and from an external speaker/microphone connected to external acoustic port 11. However, in various embodiments during a diagnostic mode, this plug detector may be disabled to force route a path from DSP 110 (and more specifically trace port driver 112) through external acoustic port 130 of ASIC 100 via switches S1 and S2. Thus, during a diagnostic mode the audio path may be force routed through the external acoustic audio port, and any mechanism present in the handset for detecting the presence of a plug within the external acoustic port may be disabled.

Figure 2B:
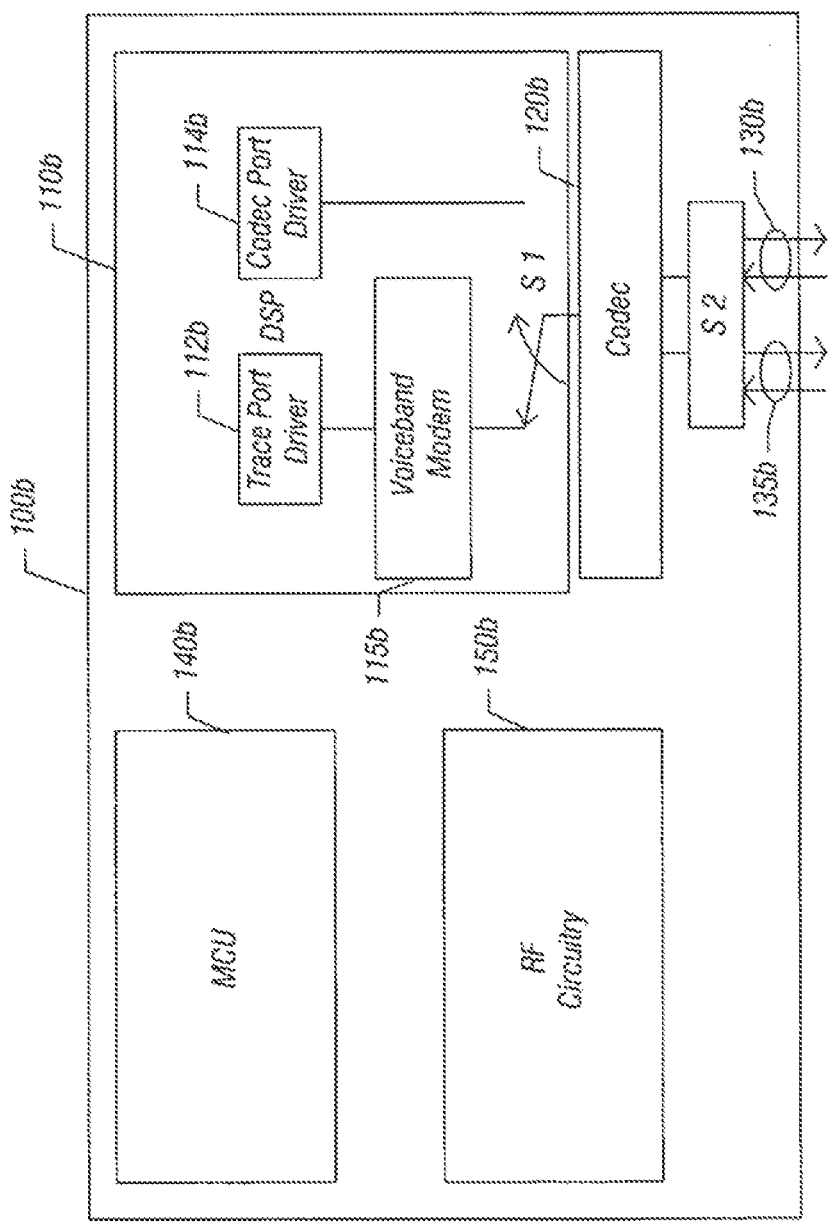
FIG. 2B is a block diagram of an integrated circuit in accordance with another embodiment of the present invention.

In other embodiments, additional functionality may be implemented within DSP 110. For example, a voiceband modem may be implemented in software (i.e., a soft modem) for execution within DSP 110. Referring now to FIG. 2B, shown is a block diagram of an integrated circuit 100b in accordance with another embodiment of the present invention. As shown in FIG. 2B, DSP 110b includes a voiceband modem 115b, in addition to a trace port driver 112b and a codec port driver 114b. Furthermore, DSP 110b includes a switch S1 to select between a path with trace port driver 112b or codec port driver 114b. In all other respects, IC 100b may correspond to IC 100 discussed above with regard to FIG. 2A.

Accordingly, to perform diagnostics the external acoustic port of a handset may be used. In some embodiments, an integrated test mode may be used to assign the external acoustic port for use in a diagnostic mode. However, other manners of allocating an external acoustic port to a diagnostic mode may be realized. When allocated to diagnostic service, the external acoustic port may remain in a diagnostic mode until one of several conditions occurs. In some embodiments, these conditions may include one of the following: (1) manual disabling of the diagnostic mode; (2) cycling of power on the handset; or (3) removing a power source from the handset (e.g., a battery).

While the types of diagnostic trace information may vary in different embodiments, in some embodiments the data may include information regarding operation of the DSP itself, along with physical layer data. Such data in the downlink direction may take various forms including, for example, log points, internal state data, and the like. Furthermore, diagnostic data to be captured may include low level data including, for example, I and Q data. Because such data may exist at higher bandwidths than may be accommodated via an external acoustic port, such data may be filtered and/or buffered, as described below. In the uplink direction, the connection from DIU 15 may carry control directives, which may take different forms. In some embodiments, the control directives may include, for example, enabling/disabling of specific trace points, querying of memory contents, modifying of internal states, and the like.

Trace data may be processed in various forms before it is sent in the downlink direction. For example, the trace data may be filtered and/or buffered. In such manner, trace data may conform to or match a speed of the link through bidirectional acoustic port 11. As discussed above, in some embodiments the link may have a speed of between approximately 50-60 kbps. To accommodate this speed, one or more buffers within DSP 110 may be used to store the trace data before it is sent through trace port driver 112. Furthermore, the trace data may be filtered. For example, only trace data that corresponds to a particular type of event (e.g., physical layer data, failure information or the like) may be sent. For example, code may be instrumented to generate trace data only for occurrences of certain events within the code.

By performing testing in accordance with an embodiment of the present invention, intermittent problems and/or problems that are hard to reproduce may be debugged. For example, issues relating to cell handover, dropping of calls and the like may be more readily debugged via field testing using a diagnostic setup in accordance with an embodiment of the present invention.

Because the external acoustic port is used for diagnostic purposes, the ability to listen to real audio during diagnostic modes may be precluded. However, while certain problems may manifest themselves as audio problems, the vast majority of problems are not in fact audio problems, but rather systemic issues, as described herein. Thus although real audio data may not be available during a diagnostic mode, successful debugging may occur.

Figure 3:
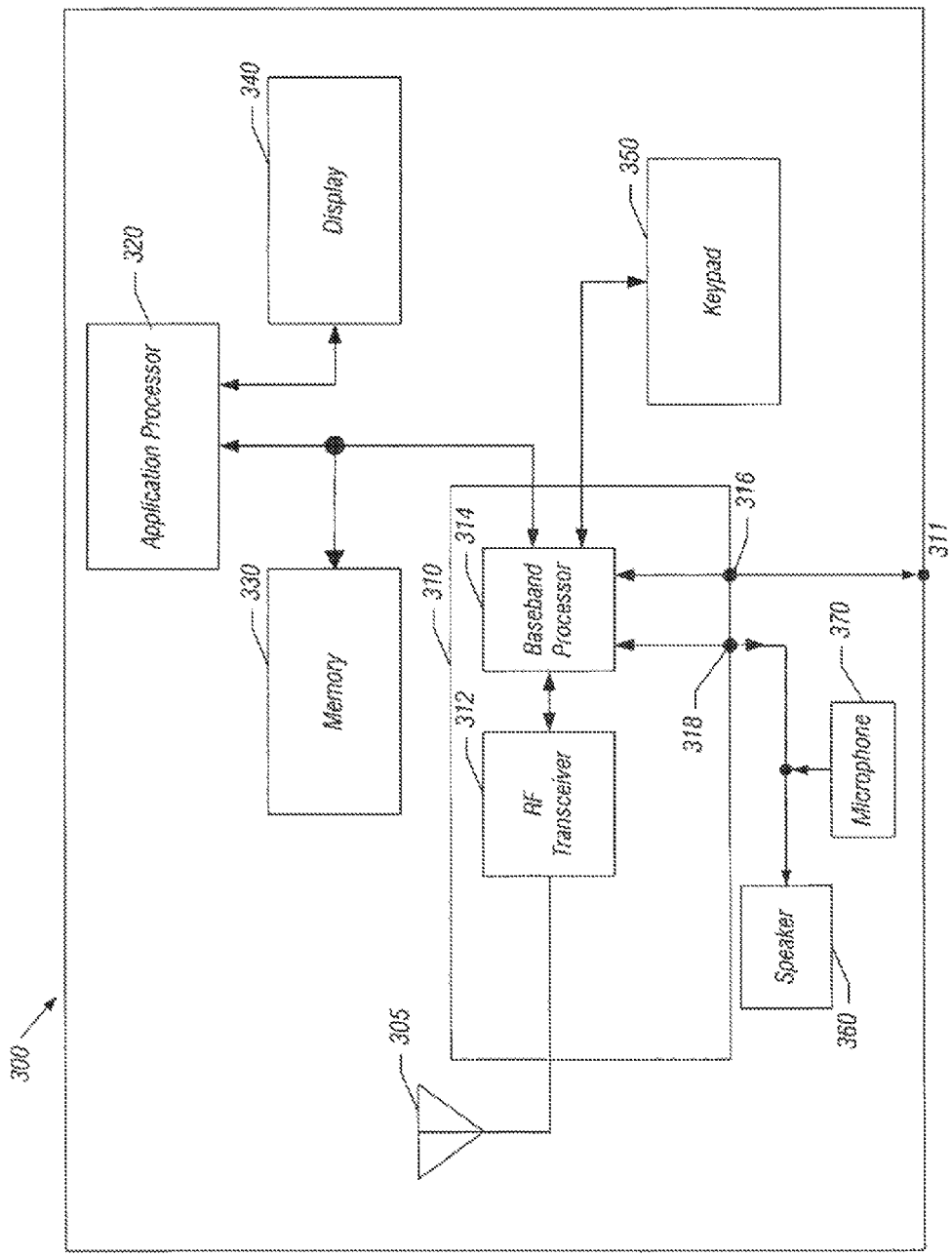
FIG. 3 is a block diagram of a system in accordance with one embodiment of the present invention.

Referring now to FIG. 3, shown is a block diagram of a system in accordance with one embodiment of the present invention. As shown in FIG. 3, system 300 may be a wireless device, such as a cellular telephone, PDA, portable computer or the like. An antenna 305 is present to receive and transmit RF signals. Antenna 305 may receive different bands of incoming RF signals using an antenna switch. For example, a quad-band receiver may be adapted to receive GSM communications, enhanced GSM (EGSM), digital cellular system (DCS) and personal communication system (PCS) signals, although the scope of the present invention is not so limited. In other embodiments, antenna 305 may be adapted for use in a general packet radio service (GPRS) device, a satellite tuner, or a wireless local area network (WLAN) device, for example.

Incoming RF signals are provided to a transceiver 310 which may be a single chip transceiver including both RF components and baseband components. Transceiver 310 may be formed using a complementary metal-oxide-semiconductor (CMOS) process, in some embodiments. As shown in FIG. 3, transceiver 310 includes an RF transceiver 312 and a baseband processor 314. RF transceiver 312 may include receive and transmit portions and may be adapted to provide frequency conversion between the RF spectrum and a baseband. Baseband signals are then provided to a baseband processor 314 for further processing.

In some embodiments, transceiver 310 may correspond to ASIC 100 of FIG. 2A. Accordingly, baseband processor 314, which may correspond to DSP 110 of FIG. 2A, may include a trace port driver and a codec port driver (not shown in FIG. 3). In turn, these ports may be coupled through the modem, codec and switches shown in FIG. 2A (not shown for ease of illustration in FIG. 3) to an external acoustic port 316 and an internal acoustic port 318. As shown in FIG. 3, external acoustic port 316 may be coupled to a bidirectional external acoustic port 311 of handset 300. Internal acoustic port 318 may be coupled to an internal speaker 360 to provide voice data to an end user. Internal acoustic port 318 also may be coupled to an internal microphone 370 to receive voice data from the end user.

After processing signals received from RF transceiver 312, baseband processor 314 may provide such signals to various locations within system 300 including, for example, an application processor 320 and a memory 330. Application processor 320 may be a microprocessor, such as a central processing unit (CPU) to control operation of system 300 and further handle processing of application programs, such as personal information management (PIM) programs, email programs, downloaded games, and the like. Memory 330 may include different memory components, such as a flash memory and a read only memory (ROM), although the scope of the present invention is not so limited. Additionally, a display 340 is shown coupled to application processor 320 to provide display of information associated with telephone calls and application programs, for example. Furthermore, a keypad 350 may be present in system 300 to receive user input.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A mobile device comprising:
a digital signal processor (DSP) adapted to process audio communications, adapted to perform a diagnostic routine to generate diagnostic information and adapted to process the diagnostic information into a modulated audio signal comprising the diagnostic information, the DSP having a port adapted to selectively output the processed audio communications or the modulated audio signal;
an internal/external switch comprising an internal/external switch input coupled to the port and adapted to selectively connect the port to an internal audio port and an external audio port, the external audio port being adapted to communicate the modulated audio signal between the DSP and a data collector during the diagnostic routine and wherein during the diagnostic routine real audio capability of the external audio port is disabled.

2. The mobile device of claim 1, wherein the DSP comprises a soft modem adapted to process the diagnostic information into the modulated audio signal.

3. The mobile device of claim 1, wherein the DSP further comprises a soft switch adapted to selectively provide the processed audio communications or the modulated audio signal to the port.

4. The mobile device of claim 1, further comprising a codec coupled between the port and the internal/external switch input.

5. The mobile device of claim 1, wherein a single integrated circuit comprises a microcontroller unit (MCU), the DSP and the internal/external switch.

6. A mobile device comprising:
an integrated circuit, the integrated circuit comprising:
a digital signal processor (DSP) adapted to process audio communications, adapted to perform a diagnostic routine to generate diagnostic information and adapted to process the diagnostic information into a modulated audio signal comprising the diagnostic information, the DSP having a port adapted to selectively output the processed audio communications or the modulated audio signal;
an internal/external switch comprising an internal/external switch input coupled to the port and adapted to selectively connect the port to an internal audio port and an external audio port, the external audio port being adapted to communicate the modulated audio signal between the DSP and a data collector during the diagnostic routine and wherein during the diagnostic routine real audio capability of the external audio port is disabled.

7. The mobile device of claim 6, wherein the DSP comprises a soft modem adapted to process the diagnostic information into the modulated audio signal.

8. The mobile device of claim 6, wherein the DSP further comprises a soft switch adapted to selectively provide the processed audio communications or the modulated audio signal to the port.

9. The mobile device of claim 6, further comprising a codec coupled between the port and the internal/external switch input.

10. A mobile device comprising:
a digital signal processor (DSP) adapted to processes acoustic information and being further adapted to perform a diagnostic routine to generate diagnostic information for use in diagnostic testing of the mobile device, the DSP comprising a data port for providing processed acoustic information and a diagnostic port for providing the diagnostic information;
a modem block connected to the diagnostic port, the modem block being adapted to modulate the diagnostic information into modulated diagnostic information; and
a first switch coupled to selectively provide a path to the diagnostic port or the data port;
an internal audio port selectively coupled to the first switch to communicate audio data with the DSP;
an external audio port selectively coupled to the first switch to communicate diagnostic information between the DSP and a data collector during the diagnostic routine and wherein during the diagnostic routine an audio path is forced through the external audio port such that real audio capability of the external audio port is disabled;
a second switch selectively coupled between the first switch and the external audio port to provide a path between the diagnostic port and the data collector during the diagnostic procedure.

11. The mobile device of claim 10, wherein the DSP, further comprises the modem block.

12. The mobile device of claim 11, wherein the modem block is a soft modem block.

13. The mobile device of claim 10, further comprising a codec block connected between the first switch and the second switch, the codec being adapted to code the modulated diagnostic information or code the processed acoustic information.

14. The mobile device of claim 10, wherein a single integrated circuit comprises a microcontroller unit (MCU), the DSP, and the first switch.

* * * * *